United States Patent Office 3,597,152
Patented Aug. 3, 1971

3,597,152
DE-WATERING OF METAL SURFACES
Richard Elliott Shaw, Windsor, England, assignor to Imperial Chemical Industries Limited, London, England
No Drawing. Continuation of abandoned application Ser. No. 462,108, June 7, 1965. This application July 1, 1969, Ser. No. 841,687
Claims priority, application Great Britain, June 10, 1964, 24,085/64
Int. Cl. C23f 15/00
U.S. Cl. 21—217
6 Claims

ABSTRACT OF THE DISCLOSURE

Metallic surfaces are de-watered and at the same time given a protective coating of oil by treating the surfaces with a composition comprising an unstable emulsion in water of a non-volatile oil containing an oil-soluble surface active agent. Preferably the composition contains at least 50% by weight of water. Preferred proportions of surface active agent lie in the range from 1% to 10% by weight of the oil. Optionally, the oil may also contain a corrosion inhibitor, preferably in a proportion of up to 20% by weight.

---

This application is a continuation of application Ser. No. 462,108 filed June 7, 1965, now abandoned.

This invention relates to processes of de-watering metal surfaces.

When metal articles have been subjected to aqueous cleaning operations it is frequently necessary to remove all traces of aqueous treating fluids or rinse water from the metal surface before further treatment or storage of the articles. If water-spots are left on the surface they can lead to localised corrosion or on evaporation leave marks which show up on further treatment such as painting.

It is common practice to remove such water spots by treating the metal surface with a de-watering agent which displaces the water and on evaporation leaves behind a protective layer of oil. Such agents usually comprise a non-volatile oily material, such as lanolin or spindle oil, a surface active agent and a cheap volatile organic diluent. If the treatment is by dipping the article in a bath of the agent the displaced water has to be free to sink under gravity to the bottom of the bath from whence it can be removed from time to time.

We have now found that aqueous compositions can be used for de-watering and protecting metal articles and that these not only have the advantages of reduced cost and reduced fire risk, but can also be more effective in use in that the water-spots are not displaced as droplets but are miscible with and taken up by the aqueous de-watering composition.

Metallic surfaces can be de-watered and at the same time given a protective coating of oil by treating the surfaces with a composition comprising an unstable emulsion in water of a non-volatile oil containing an oil-soluble surface active agent.

Preferably the emulsion is at a temperature of at least 40° C.

The treatment can be for example by immersion of the metal article in a bath of the unstable emulsion which is stirred or otherwise circulated to maintain the oil in disperse form in the aqueous phase. Preferably the treatment is by spraying the unstable emulsion onto the surface to be de-watered and protected. The sprayed emulsion can, of course, be collected and re-circulated through the spray system.

By "unstable emulsion" we mean one in which, on standing, an oily layer separates out in the course of not more than one hour or so. In use, the oil is maintained in emulsion in the aqueous phase by the stirring, spraying or other circulation involved in the application of the de-watering composition to the metal articles.

Preferably the composition contains at least 50% by weight of water. The minimum oil content depends to some extent on the condition of the surface to be treated and the amount of oil to be deposited thereon, but in general the most useful content is from 0.5% to 10% by weight of the composition.

In general oils commonly used in protective coating of metals can be used in this invention provided they are liquid at the processing temperature. Particularly suitable oils are hydrocarbon oils, such as spindle oil. Protective materials of thick consistency, e.g. lanolin, may be incorporated in the oil provided that the resulting mixture is still liquid.

The surface active agent should be distributed for the most part in the oil phase and for this reason an oil-soluble agent is used. Oil-soluble non-ionic agents made by condensing fatty alcohols such as oleyl and cetyl alcohol with ethylene oxide and oil-soluble blends of alkyl phenol/ethylene oxide condensates with long chain fatty acids are particularly suitable. Preferred proportions of surface active agent lie in the range from 1% to 10% by weight of the oil. Higher proportions can be used if desired. Surface active agents, e.g. some cationic agents, which produce a stable emulsion of the oil in the water are unsuitable for use in the process of this invention.

The treatment of this invention is particularly suitable for application to metal parts which have been cleaned by acid or alkali or by emulsified solvent cleaners. The oily layer left by the treatment gives a light degree of protection of value in temporary or week-end shutdowns of plants, in which periods newly cleaned metal is very susceptible to rusting. In order to improve the degree of protection against corrosion provided by the oily layer deposited on metal surfaces treated with the de-watering composition, the composition may also contain, dissolved in the oil, a corrosion inhibitor such as a trialkyl phosphate or triethanolamine and oleic acid.

As an example of the treatment, metal parts which had been cleaned with an emulsified solvent cleaner were sprayed for one minute with an emulsion, heated to 55° C., of the following composition:

| | Parts by weight |
|---|---|
| Light petroleum oil (viscosity 0.5 poise at 25° C.) | 9.4 |
| Surface active agent (oleyl/cetyl alcohol condensed with 2.5 moles ethylene oxide) | 0.6 |
| Water | 90.0 |

On standing, any excess de-watering agent drained off the surface of the parts and left them free of water-marks and covered with a thin film of oil.

Similar results were obtained when water-wet metal parts were immersed for two minutes in a vigorously stirred bath of the same composition at the same temperature, the parts then being withdrawn and allowed to drain.

The degree of protection against corrosion provided by treatment with the above composition may be improved by dissolving in the oil 0.27 part of triethanolamine and 0.88 part of oleic acid.

The invention also provides concentrates for use in making up the composition used in the above-described processes, the concentrates comprising a non-volatile hydrocarbon oil having dissolved therein from 1% to 10% by weight of a surface active agent. Optionally, the oil may also contain a corrosion inhibitor, preferably in a proportion of up to 20% by weight.

What is claimed is:
1. A process of de-watering water-wet metal surfaces: which comprises contacting them with a composition consisting essentially of an unstable emulsion in water of a non-volatile oil in an amount sufficient to deposit oil on said metal surface and containing an oil-soluble non-ionic surface active agent from which emulsion an oily layer separates on standing for not more than about one hour, said composition containing about 0.5 to 50% by weight of said surface active agent based on the weight of said oil, the metal surface being contacted with said composition until oil is deposited on the metal surface and displaces water on said surface and thereafter draining excess emulsion from said surface leaving a protective coating of said oil on said surface.

2. A process as claimed in claim 1 in which the composition contains from 0.5% to 10% by weight of oil.

3. A process as claimed in claim 1 in which the surface active agent is a non-ionic condensate of ethylene oxide with a material containing fatty hydrocarbon chains.

4. A process as claimed in claim 1 in which the oil contains a corrosion inhibitor.

5. A process as claimed in claim 1 in which the composition is at a temperature of at least 40° C.

6. A process of de-watering a water-wet metal surface which comprises contacting said metal surface with a composition consisting essentially of an unstable emulsion of a liquid non-volatile oil in an amount sufficient to deposit oil on said metal surface and containing an oil-soluble surface active agent from which emulsion an oily layer separates on standing for not more than about one hour, the amount of said oil being less than 50% by weight of said composition and the amount of said surface active agent being 1—10% by weight of the oil, the metal surface being contacted with said composition until oil is deposited on the metal surface and displaces water on said surface.

References Cited

UNITED STATES PATENTS

| 2,134,319 | 10/1938 | Stone | 117—49 |
| 2,428,364 | 10/1947 | Frager | 117—49 |
| 2,123,856 | 7/1938 | Swift | 252—165 |
| 3,167,514 | 1/1965 | Baker | 252—171X |
| 3,245,910 | 4/1966 | Lowe | 252—396 |

JOHN D. WELSH, Primary Examiner

W. E. SCHULZ, Assistant Examiner

U.S. Cl. X.R.

117—49; 134—2; 148—6.14; 252—89, 328, 358